H. W. STEWART.
SUN AND STORM SHADE FOR AUTOMOBILES.
APPLICATION FILED APR. 23, 1921.

1,420,779.

Patented June 27, 1922.

Inventor
H. W. Stewart
by his Attorneys
Baldwin & Wight

H. W. STEWART.
SUN AND STORM SHADE FOR AUTOMOBILES.
APPLICATION FILED APR. 23, 1921.
1,420,779.
Patented June 27, 1922.
2 SHEETS—SHEET 2.
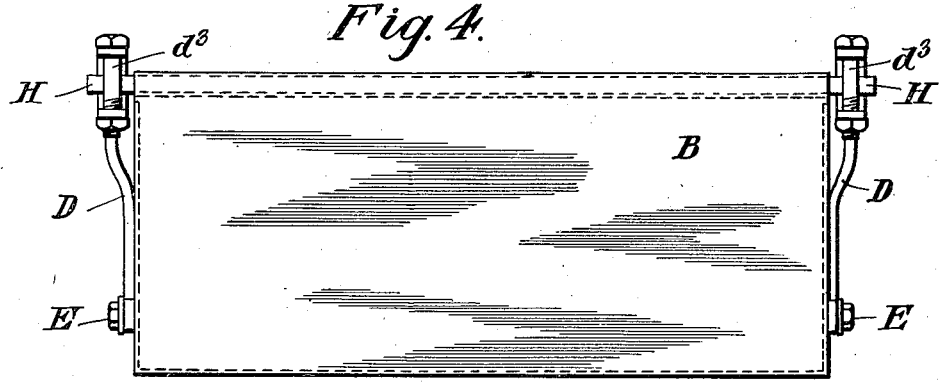
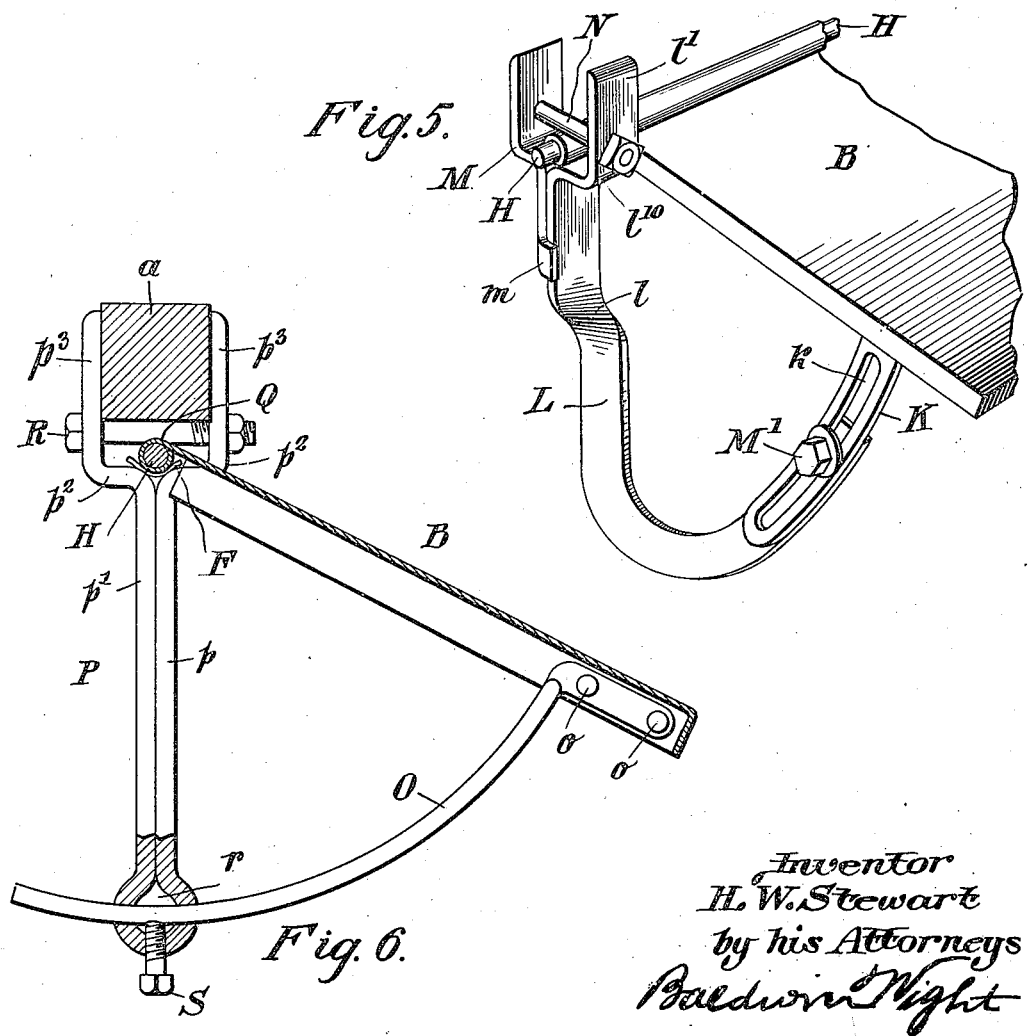

UNITED STATES PATENT OFFICE.

HENRY W. STEWART, OF EL PASO, TEXAS.

SUN AND STORM SHADE FOR AUTOMOBILES.

1,420,779. Specification of Letters Patent. Patented June 27, 1922.

Application filed April 23, 1921. Serial No. 463,884.

*To all whom it may concern:*

Be it known that I, HENRY W. STEWART, a citizen of the United States, residing at El Paso, in the county of El Paso and State of Texas, have invented certain new and useful Improvements in Sun and Storm Shades for Automobiles, of which the following is a specification.

The object of this invention is to provide a shield or shade of improved construction and adapted to be attached to an automobile for the purpose of protecting the occupants of the vehicle from the glare of the sun either direct or reflected and also to protect to a large extent the wind shield from the effects of snow, rain, etc., which would tend to blur the wind shield and mar the vision.

It is desirable that the shade or shield should be of simple construction, readily applied to automobiles in use, as well as to new ones, and that it should be free from complications and readily adjusted to the desired extent.

According to my invention I provide frame members to which the body of the shade is pivotally connected, and which are provided with means for attaching them to the front bow of the vehicle top. Means is also provided for adjusting the shield body and for holding it at any desired angle.

In the accompanying drawings:—

Figure 4 is a plan view of the shield or shade.

Figure 5 is a perspective view of a modification.

Figure 6 is a sectional view showing a further modification.

In Figures 1 to 4, inclusive, the front portion of an automobile is indicated at A. B indicates the sun and storm shield, and C indicates the wind shield. The body of the shield B may be made of metal or other suitable material. It is pivotally connected with the frame members by a rod H which extends through its upper or rear end and rests on bearing pieces F supported by the parts D and G of the frame. Each part D consists of a curved metal piece having a curved slot $d^4$ at its outer end and bent or twisted at $d$ and $d^{10}$ to provide a part $d'$ adapted to lie against the front bow $a$ of the vehicle top. This part D is associated with a metallic clamping part G shouldered at $g'$ and adapted to lie against the rear face of the bow $a$. The part G is formed with flanges $g$ between which the inner portion of the frame part D is arranged and which prevents sidewise movement of the frame. The parts D and G on each side of the shield are clamped on the bow $a$ by a bolt $d^3$.

Figure 1:
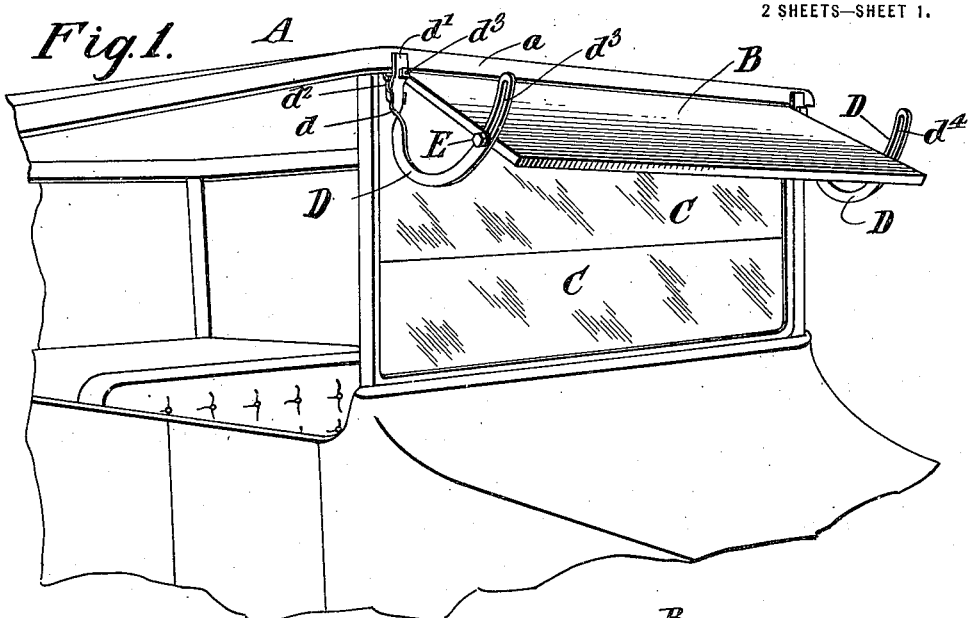
Figure 1 is a perspective view of a portion of an automobile with my improvements applied.
Figure 3:
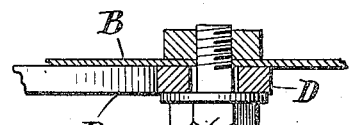
Figure 3 shows a section on the line 3—3 of Figure 2.
Figure 2:
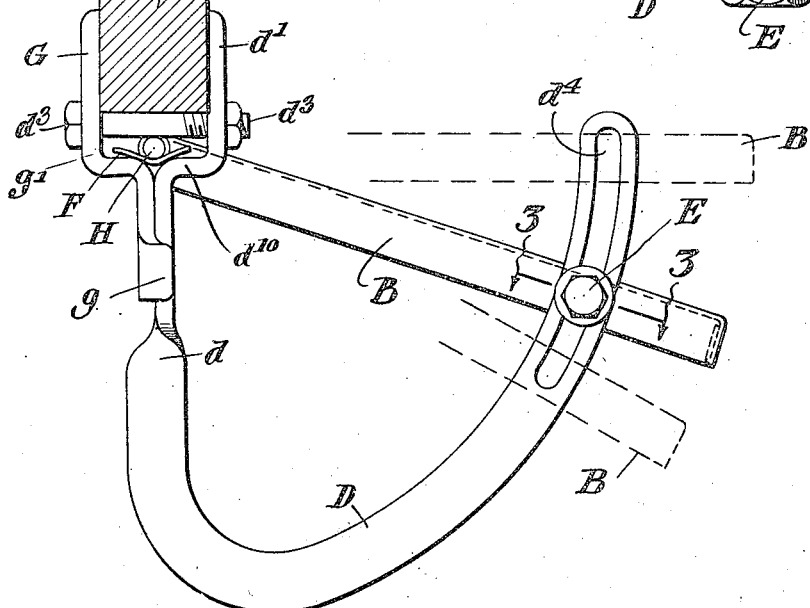
Figure 2 is an end view of my improvements.

The outer or front part of the shield body is connected with the frame members by nut carrying bolts E in the manner shown in Figures 2 and 3.

It will be observed that the side members are so applied to the automobile as to not interfere with the adjustments of the wind shield. The shield may be easily set and held at any desired angle and may be quickly removed or quickly placed in position. The construction is extremely simple, not difficult to understand or operate, and the shield may be manufactured at small expense.

In Figure 5, I have shown a modified form of frame. In this instance the frame member on each side comprises a part K slotted at $k$ and a curved part L associated with a clamp M by means of which it may be attached to the bow $a$ of the automobile top. The part L is bent or twisted at $l$ and $l^{10}$ to provide a part $l'$ co-operating with the clamping member M. A nut carrying bolt N is employed to hold the members L and M in firm engagement with the bow. The part L carries a nut carrying bolt M' extending through the slot $k$ of the part K and by adjusting this bolt, the angle of the body portion of the shield may be set at any desired angle.

In Figure 6 the shade body B is secured at $o$ to a curved frame member O which extends through the end $r$ of a frame member P which is secured to the bow $a$. This frame member P may be made of a single piece of strap metal having parallel members $p, p'$, the upper or lower ends of which carry an adjusting bolt S engaging the curved member O. These members $p, p'$ are bent at $p^2$ to provide clamping members $p^3$ which carry a nut carrying bolt R which holds the members in firm engagement with the bow. The shield body B is pivotally connected with the frame by a rod H which rests on bearing pieces F of the kind shown in Figure 2. It will be observed that the parts of the shield are all so connected that they cannot readily be separated. There are no loose parts. It is only necessary to adjust the bolt R so as to loosen the clamping members when they may be easily applied to the bow and tightened thereon. This is done without in any way interfering with the connections between the shield body and the frame members. This feature of the invention is true of all the modifications shown. It will be further observed that in each case the pivot rod H is held in place between the shoulders of the frame and the clamping bolts and cannot readily be displaced.

I claim as my invention:

1. A sun and storm shield or shade for automobiles, comprising a body portion and frame members at opposite ends thereof, each frame member having a clamp comprising two shouldered parts adapted to be clamped on the front bow of an automobile top, and a clamping bolt, a pivot rod to which the rear of the body portion of the shield is attached and which is supported by said shouldered parts of the clamp and held in place by the clamping bolt, and interengaging means carried by the front portion of the shield body and the outer ends of the frame members and forming adjustable connections therebetween.

2. A sun and storm shield for automobiles, comprising a body portion and frame members at opposite ends thereof, each frame member comprising two clamping members, one of which has an outwardly extending curved slotted portion, a bolt connecting the clamping members, a pivot rod associated with the body portion of the shield and held in position between the clamping members, and the bolt, and means carried by the front portion of the shield body for engaging the slotted members to provide for an adjustment of the shield.

3. A sun and storm shield for automobiles, comprising a body portion and frame members at opposite ends thereof, each frame member comprising two engaging clamping members and a bolt for connecting them and clamping them to the front bow of an automobile, a pivot rod associated with the body portion and positioned between the clamping members and bolt, one of said clamping members having an outwardly extending portion, and interengaging means carried by the front portion of the shield body and forming an adjustable connection with the clamping member.

In testimony whereof, I have hereunto subscribed my name.

HENRY W. STEWART.